United States Patent [19]

Lavene

[11] Patent Number: 5,371,650
[45] Date of Patent: Dec. 6, 1994

[54] HERMETICALLY SEALED CAPACITOR AND METHOD FOR MAKING THE SAME

[75] Inventor: Bernard Lavene, Ocean, N.J.

[73] Assignee: Electronic Concepts, Inc., Eatontown, N.J.

[21] Appl. No.: 196,520

[22] Filed: Feb. 15, 1994

[51] Int. Cl.⁵ .......................... H01G 1/02; H01G 4/06
[52] U.S. Cl. ................................... 361/310; 29/25.42; 361/272; 361/308.2; 361/536; 361/537
[58] Field of Search ................ 361/301.3, 301.5, 306.1, 361/307, 308.1, 308.2, 308.3, 309, 310, 272, 518, 519, 520, 536, 537, 538, 530, 321.6; 29/25.03, 25.42

[56] References Cited

U.S. PATENT DOCUMENTS

| | | | |
|---|---|---|---|
| 2,634,314 | 4/1953 | Netherwood | 361/272 |
| 2,904,618 | 9/1959 | Robinson et al. | |
| 2,941,024 | 6/1960 | Lamphier | |
| 3,036,249 | 5/1962 | Hall | |
| 3,124,728 | 3/1964 | Ruben | |
| 3,185,759 | 5/1965 | Sheehan | 361/272 |
| 3,296,505 | 1/1967 | Sparrow et al. | |
| 3,343,047 | 9/1967 | Comado et al. | |
| 3,439,231 | 4/1969 | Booe | 361/536 |
| 3,466,508 | 9/1969 | Booe | |
| 3,482,154 | 12/1969 | Robinson | |
| 3,611,054 | 10/1971 | Piper et al. | 361/538 |
| 3,917,986 | 11/1975 | Rice et al. | |
| 4,010,405 | 3/1977 | West | |
| 4,127,890 | 11/1978 | Rayburn | |
| 4,127,891 | 11/1978 | Rayburn | |
| 4,267,565 | 5/1981 | Puppolo et al. | 361/530 |
| 4,330,929 | 5/1982 | Cripe | |
| 4,538,212 | 8/1985 | Montgomery | |
| 4,603,373 | 7/1986 | Lavene | |
| 4,685,026 | 8/1987 | Lavene | |
| 4,912,595 | 3/1990 | Tanaka | |
| 4,980,798 | 12/1990 | Lavene | |
| 4,983,943 | 1/1991 | Murata et al. | |
| 5,032,950 | 7/1991 | Lavene | |
| 5,043,849 | 8/1991 | Libby | |
| 5,086,554 | 2/1992 | Murata et al. | |
| 5,187,857 | 2/1993 | Nakao et al. | |

FOREIGN PATENT DOCUMENTS

| | | | |
|---|---|---|---|
| 644901 | 7/1962 | Canada | 174/DIG. 8 |
| 929000 | 12/1947 | France | 361/272 |
| 878414 | 6/1953 | Germany | 361/272 |

Primary Examiner—Geoffrey S. Evans
Assistant Examiner—Gregory L. Mills
Attorney, Agent, or Firm—Ratner & Prestia

[57] ABSTRACT

A hermetically sealed capacitor including a metal tape (e.g, copper) having an adhesive on one side and being folded and wrapped around the capacitor winding in the manner that a Christmas package is wrapped. After wrapping, the tape initially extends beyond both ends of the capacitor. The tape is then folded at one end of the capacitor. The seam of the tape overlapping itself (along the length of the capacitor) and the fold at the one end of the capacitor are each soldered. On the other end of the capacitor, a ceramic header having a through hole (for one of the capacitor leads) is positioned. The tape extends beyond the ceramic header and is folded so as to make contact with the ceramic header. The seam between the metal tape and the ceramic piece is then soldered. In this way, a small, hermetically sealed capacitor is obtained.

10 Claims, 3 Drawing Sheets

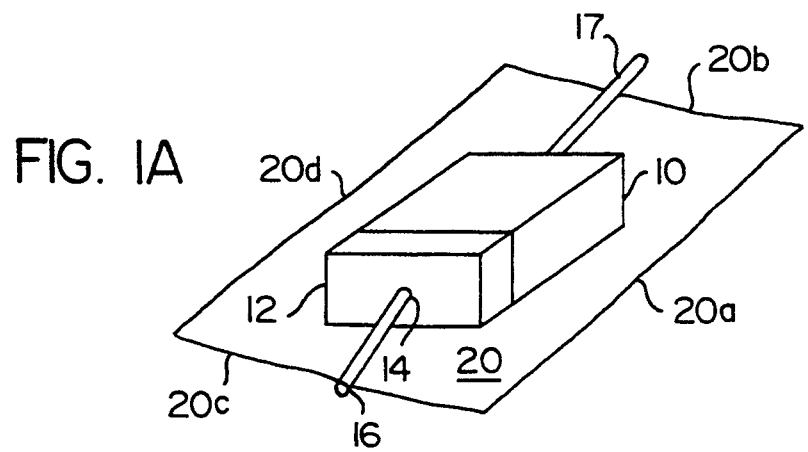
FIG. IA
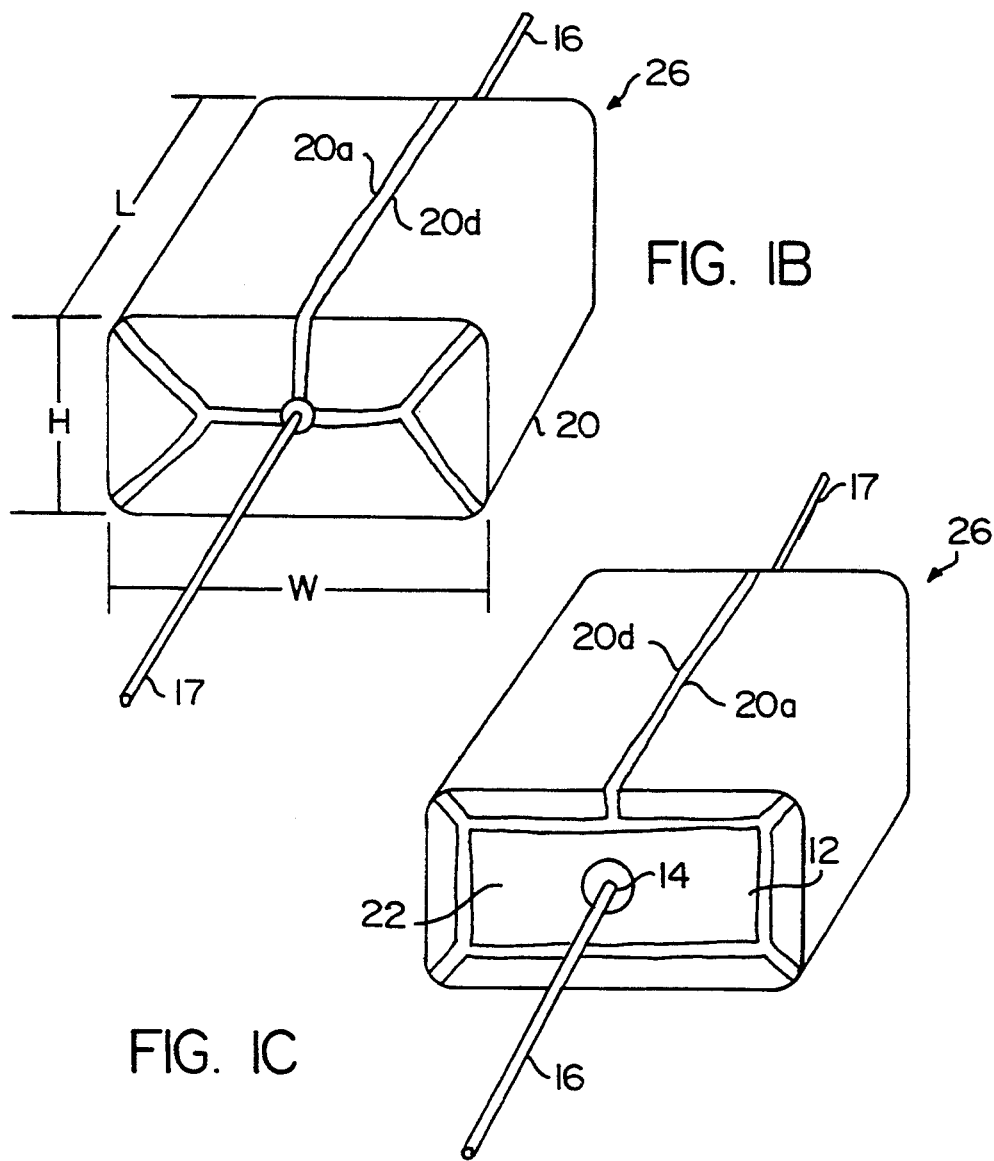
FIG. IB
FIG. IC

FIG. 4A
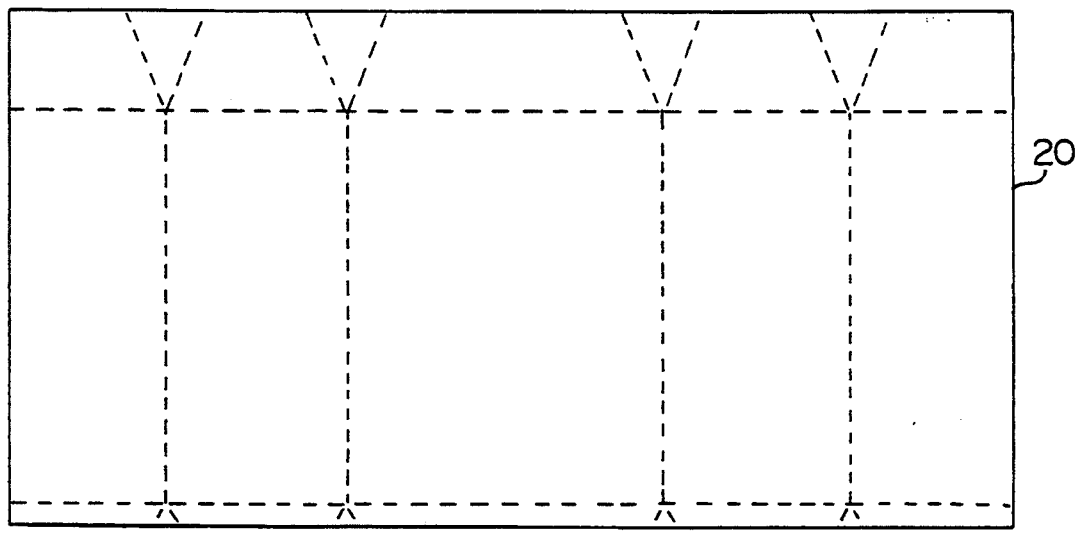
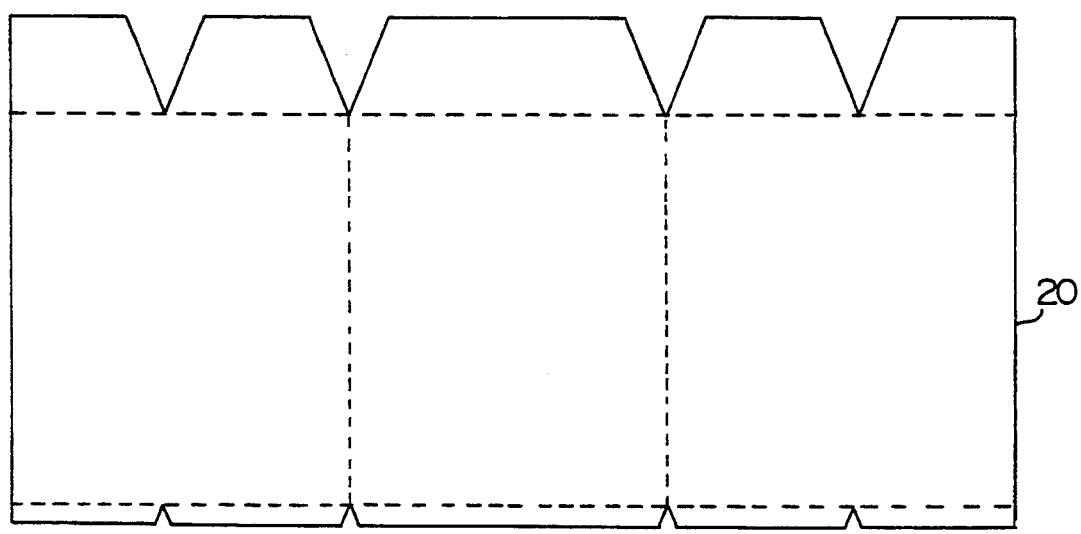
FIG. 4B

HERMETICALLY SEALED CAPACITOR AND METHOD FOR MAKING THE SAME

FIELD OF THE INVENTION

This invention relates to a hermetically sealed capacitor and, more particularly, to hermetically sealing a capacitor using a metal wrap.

BACKGROUND OF THE INVENTION

Capacitors may be sealed in a number of ways. A simple, inexpensive procedure is to solder a lead to a conductive coating and dip the entire device in hardenable low density plastic, such as epoxy resin. This type of seal is subject to environmental conditions, however, because the plastic is not impervious to moisture.

In a second, superior sealing process, the capacitor is inserted in a solderable metal casing or can. The conductive coating is electrically and mechanically connected with the casing by imbedding the capacitor in soft solder. A connecting wire is attached to the bottom of the casing to serve as the external cathode lead. The anode wire with its attached input lead extends to an opening at the opposite end of the casing. This opening can be hermetically sealed by providing a metal-glass-metal cover. Both the metal and anode wire and the metal casing are soldered to the respective metal portions of the cover, with a glass providing an insulation between the anode wire and the casing.

And, in a third sealing process, the expensive metal-glass-metal cover is replaced by a hardenable plastic which fills the open end of the casing. Although this type of seal is less expensive, the plastic itself is pervious, particularly at the interface between metal and plastic: namely, along the anode wire lead and along the casing wall. Moisture may reach the inside of the casing via the interface causing failure of the capacitor.

With respect to wrapping of capacitors, U.S. Pat. No. 5,032,950 which issued on Jul. 16, 1991 is directed to a cuff tape wrap and fill capacitor. The capacitor comprises a press capacitor having conductor foil cuffs. The cuffs are provided either in the form of bands or in the form of folds. The cuffs may be prepared from any flexible conducting material. The ends of the capacitor are sealed with an appropriate sealing means such as high temperature epoxy of silicon resin.

SUMMARY OF THE INVENTION

The present invention involves a hermetically sealed capacitor and method which includes a capacitor winding and a ceramic header disposed adjacent thereto. An electrically conductive metal tape is wrapped and folded around and adhered to the capacitor winding and ceramic header, wherein seams created by wrapping and folding the metal tape are secured to form the hermetically sealed capacitor. One capacitor lead passes through and is isolated by the ceramic header while the other capacitor lead is connected to the metal tape.

BRIEF DESCRIPTION OF THE DRAWINGS

FIG. 1a is a view of a partially wrapped capacitor element according to a first exemplary embodiment;

FIG. 1b is a perspective view of the rear end of a completely wrapped capacitor element according to a first exemplary embodiment;

FIG. 1c is a perspective view of the front end of a completely wrapped capacitor element according to a first exemplary embodiment;

FIG. 4a is a perspective view of the metal tape to be wrapped and folded; and

FIG. 4b is a perspective view of pre-cut metal tape to be wrapped and folded.

DETAILED DESCRIPTION OF THE INVENTION

Figure 2A:
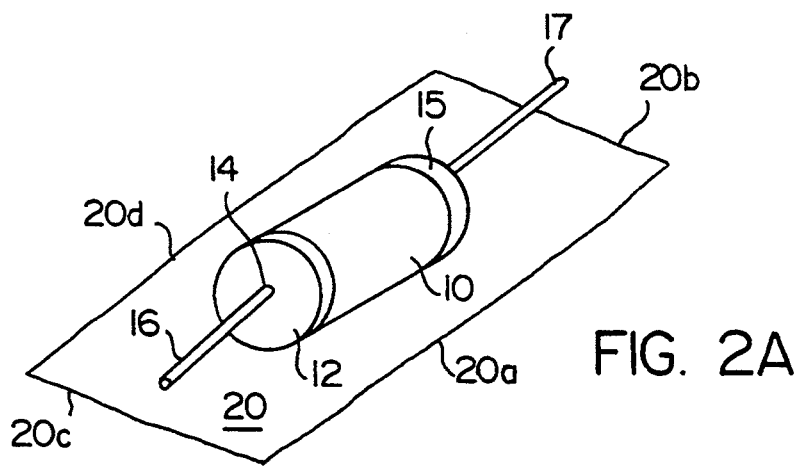
FIG. 2a is a view of a partially wrapped capacitor element according to a second exemplary embodiment.

An exemplary application for the hermetically sealed capacitor of the present invention is in the field of implantable defibrillators which have a need for small, hermetically sealed capacitors.

Referring now to FIG. 1a, a hermetically sealed capacitor according to a first exemplary embodiment of the present invention comprises a pressed capacitor winding 10 wrapped with a metal tape in the manner similar to how a package (e.g., Christmas package) is wrapped.

The capacitor winding 10 is prepared by methods known to those skilled in the art, typically from strips or webs of the dielectric having electrically conductive material disposed thereon. Usually, two or more such webs are wound together with a layer of dielectric between the conductive layers to insulate the electrodes from each other. Optionally, the capacitor lining may be pressed into some desired shape. Various methods of fabrication and types of materials may be employed in the manufacture of capacitor windings and this invention is not limited to any specific winding technology. One example can be found in U.S. Pat. No. 4,470,097 (issued on Sep. 4, 1984 to Lavene) which is herein incorporated by reference.

In FIG. 1a, positioned adjacent to capacitor winding 10 is a ceramic header 12. Ceramic header 12 includes a through-hole 14 for providing access for one of the capacitor's leads 16. Ceramic header 12 functions to maintain hermeticity for the sealed capacitor as well as functions to isolate the poles of the capacitor since, as described below, the metal tape used to wrap the capacitor may contact the ground pole of the capacitor.

In the exemplary embodiment of the present invention, capacitor winding 10 can be a metallized or film-/foil combination capacitor. Once formed, both sides of the capacitor are sprayed and sealed with a zinc/tin alloy to function as respective bases to which leads can be secured. Capacitor lead 16 extends through through-hole 14 of ceramic header 12 and is connected to capacitor winding 10. Lead 17, on the other hand, can be connected either directly to capacitor winding 10 or to metal tape 20 since, in the preferred embodiment, metal tape 20 is electrically connected to that end of capacitor winding 10 when it is finally wrapped. Both leads 16 and 17 are connected by welding or soldering.

Underlying capacitor winding 10 and ceramic header 12 is a piece of metal tape 20 having an adhesive (e.g., polymer adhesive) on its upper surface. In the exemplary embodiment of the present invention, metal tape 20 is copper and can be from 2 mils to 30 mils thick depending on the rigidity requirements of a particular application. As appreciated by those skilled in the art, metal tape 20 can be constructed of most any type of conductive material which is easily solderable and suitable for fabricating a tape such as, for example, brass or the like.

Continuing with FIG. 1a, metal tape 20 initially extends beyond the front end (where ceramic header 12 is positioned) as well as the rear end (where capacitor winding 10 is positioned). Metal tape 20 is wrapped around capacitor winding 10 and ceramic header 12 which abut one another, then, the over-extended edges of metal tape 20 are folded.

Referring to FIGS. 1b and 1c, the seam (or unsecured tape 20 edges) created by wrapping edge 20a towards edge 20d is caused by metal tape 20 overlapping itself (along the length of capacitor/ceramic header). Next, as shown in FIG. 1b, integral portions of the wrapped metal tape extending beyond the rear end are folded so as to completely cover the rear end of capacitor winding 10.

The process of folding the metal tape can be accomplished several ways. First, metal tape 20 can be pre-cut as shown in FIG. 4b with specific dimensions such that simply folding the sections of the pre-cut tape create the seams as shown in FIGS. 1b and 1c.

Second, if metal tape 20 has the shape shown in FIG. 1a, once the tape is wrapped, integral portions of metal tape 20 extending beyond the rear end are folded to desirably create a seam configuration similar to that shown in FIG. 1b. To do so, one way is to push in and down on the side portions extending beyond the rear end which, in turn, causes the top and bottom portions to fold over. The resulting seam configuration (shown in FIG. 1b) is caused by corner creased portions of metal tape 20, initially extending beyond the rear end portion, and now pressing against the rear end portion of capacitor winding 10. FIG. 4a shows an example of where the wrap and fold lines (shown with dotted lines) could be.

The length-wise seam along with the seams of the fold on the rear end of capacitor 26 are each secured which, in the exemplary embodiment of the present invention, is performed by soldering. The soldering functions to actually bridge the adhesive beneath the metal tape.

It should be noted that the seams on the rear end of capacitor 26 are secured in such a way as to allow capacitor lead 17 to contact capacitor winding 10, as mentioned, either directly or via metal tape 20.

Figure 3:
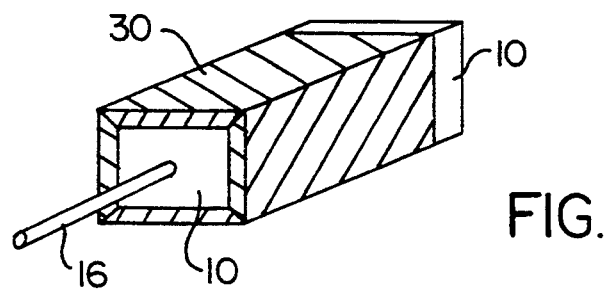
FIG. 3 is a view of the capacitor element according to the first exemplary embodiment wrapped with an insulating wrap.

As shown in FIG. 1c, at the front end, a ceramic header 12 with a through-hole 14 (for the capacitor's lead wire) is positioned adjacent to the capacitor winding 10. The metal tape extending beyond the front end is folded so as to make contact with ceramic header 12. It should be noted that in the exemplary embodiment of the present invention, the fold at the front end, although performed similarly to that of the rear end, is such that a portion of the outer surface 22 of ceramic header 12, including the area surrounding through-hole 14, remains exposed. In this way, lead 16 is isolated from tape 20 which, as described above, is in contact with lead 17. In the preferred embodiment as shown in FIG. 3, in addition to ceramic header 12, an insulating wrap 30 constructed of, for example, Mylar, is wrapped around capacitor winding 10 to provide further insulation between the two terminals of the capacitor. It should be noted that insulating wrap 30 is put in place prior to abutting ceramic header 12 against capacitor winding 10.

The seam at the front end between metal tape 20 and ceramic header 12 is then soldered. Once soldered, a hermetically sealed capacitor 26, which is only a few mils thicker than the actual capacitor winding 10, is obtained. In the exemplary embodiment of the present invention, hermetically sealed capacitor 26 is approximately 1.875 inches long, 0.5 inches in height and 0.9 inches wide.

Figure 2B:
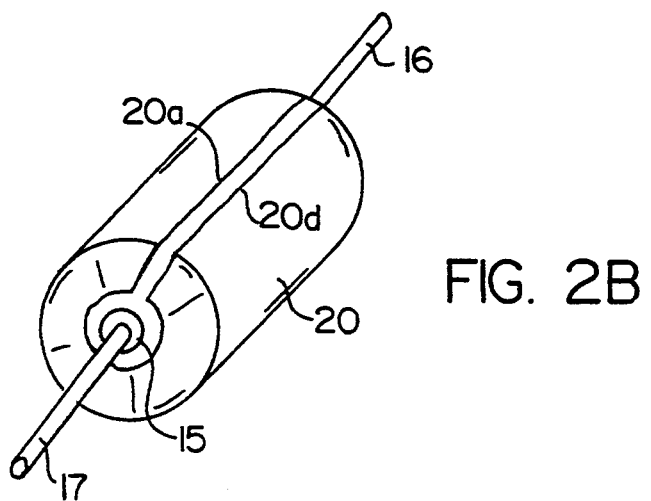
FIG. 2b is a perspective view of the rear end of a completely wrapped capacitor element according to a second exemplary embodiment.

FIGS. 2a and 2b show a second exemplary embodiment of the present invention in which the capacitor has a cylindrical shape rather than a rectangular shape. The embodiment of FIG. 2a includes the same parts as that of FIG. 1a except, in a preferred embodiment, for a cylindrical metal disc 15 positioned adjacent to capacitor winding 10 at the rear end. Cylindrical disc 15 includes a through-hole for lead 17 to pass through. Its purpose is to provide a base onto which the folded metal tape 20 can be soldered because folding tape around a cylinder can be more difficult than folding tape around a rectangular object. Thus, if metal tape 20 is not completely folded around the rear end, metal disc 15 provides the backup to which metal tape 20 can be soldered in order to properly hermetically seal the capacitor as shown in FIG. 2b.

Although the present invention has been described with reference to particular embodiments, this description should not be construed as placing any undue limitations on the invention as claimed herein.

What is claimed:

1. A hermetically sealed capacitor comprising:
   a capacitor winding having two terminals, each terminal respectively connected to a first and second lead;
   a ceramic header, having a hole, disposed adjacent to the capacitor winding, the ceramic header hole allows the first lead to pass therethrough;
   an electrically conductive tape, having an adhesive, wrapped and folded around the capacitor winding and ceramic header, wherein seams created by wrapping and folding the tape are sealed to form the hermetically sealed capacitor, the electrically conductive tape connected to the second lead and its respective terminal, wherein the tape is wrapped and folded such that integral portions of the tape completely cover a back end of the capacitor and partially cover a front end to leave a portion of the ceramic header exposed.

2. The hermetically sealed capacitor of claim 1, further comprising an insulating wrap around the capacitor winding for insulating the conductive tape from the first terminal to which the conductive tape is not connected.

3. The hermetically sealed capacitor of claim 1, wherein the electrically conductive tape is metal.

4. The hermetically sealed capacitor of claim 3, wherein the electrically conductive tape is copper.

5. The hermetically sealed capacitor of claim 1, wherein the seams are sealed by soldering.

6. The hermetically sealed capacitor of claim 1, wherein the capacitor winding and ceramic header are rectangular shaped.

7. The hermetically sealed capacitor of claim 1, wherein the capacitor winding and ceramic header are cylindrical shaped.

8. A method for fabricating a hermetically sealed capacitor comprising the steps of:

positioning a capacitor winding and a ceramic header adjacent to an electrically conductive tape;

wrapping the tape around the capacitor winding and ceramic header so the tape extends beyond both ends of the capacitor;

folding integral portions of the tape to cover all of a rear end of the capacitor winding and at least a portion of a front end of the ceramic header; and soldering the seams formed by wrapping and folding the tape at both ends to form a hermetically sealed capacitor.

9. The method of claim 8 further comprising the step of:

wrapping the capacitor winding with an insulating wrap prior to positioning the capacitor winding and ceramic header adjacent to the electrically conductive tape.

10. The method of claim 8, wherein the ceramic header has a through-hole, further comprising the steps of:

soldering leads to both ends of the capacitor winding prior to wrapping;

passing one lead through the ceramic header through-hole; and connecting the other lead to the wrapped electrically conductive tape.

* * * * *